United States Patent
Yoon et al.

(10) Patent No.: US 7,433,410 B2
(45) Date of Patent: Oct. 7, 2008

(54) VIDEO MP3 SYSTEM WITH APPARATUS AND METHOD FOR GENERATING AND RESTORING REDUCED VIDEO DATA

(75) Inventors: Seok-joong Yoon, Seongnam (KR); Han-ju Yu, Suwon (KR)

(73) Assignee: Samsung Electronics Co., Ltd. (KR)

( * ) Notice: Subject to any disclaimer, the term of this patent is extended or adjusted under 35 U.S.C. 154(b) by 1049 days.

(21) Appl. No.: 09/971,299

(22) Filed: Oct. 4, 2001

(65) Prior Publication Data

US 2002/0057743 A1 May 16, 2002

(30) Foreign Application Priority Data

Oct. 5, 2000 (KR) ............................... 2000-58483
Apr. 18, 2001 (KR) ............................... 2001-20808

(51) Int. Cl.
*H04N 7/18* (2006.01)
(52) U.S. Cl. ............................... 375/240.25; 375/240.26
(58) Field of Classification Search .. 375/240.1–240.29
See application file for complete search history.

(56) References Cited

U.S. PATENT DOCUMENTS

| | | | | | |
|---|---|---|---|---|---|
| 5,737,023 | A | * | 4/1998 | Linzer | 375/240.15 |
| 6,141,693 | A | * | 10/2000 | Perlman et al. | 709/236 |
| 6,292,440 | B1 | * | 9/2001 | Lee | 369/7 |
| 6,483,428 | B1 | * | 11/2002 | Fish et al. | 340/425.5 |
| 6,535,804 | B1 | * | 3/2003 | Chun | 701/35 |
| 6,557,001 | B1 | * | 4/2003 | Dvir et al. | 707/101 |
| 6,647,061 | B1 | * | 11/2003 | Panusopone et al. | 375/240.12 |
| 6,717,607 | B1 | * | 4/2004 | Lauper et al. | 348/14.08 |
| 6,728,315 | B2 | * | 4/2004 | Haskell et al. | 375/240.16 |
| 6,825,832 | B2 | * | 11/2004 | Chung et al. | 345/168 |
| 7,085,320 | B2 | * | 8/2006 | Ouyang et al. | 375/240.12 |

\* cited by examiner

*Primary Examiner*—Andy S Rao
(74) *Attorney, Agent, or Firm*—Mills & Onello LLP

(57) ABSTRACT

A video MP3 system including an audio/video (AV) decoder which further comprises a video decoder for restoring a moving picture signal in a MP3 player for restoring an audio signal, an apparatus and method for generating reduced video data which are appropriate for use in the video MP3 system, and an apparatus and method for restoring the reduced video data are provided. In the apparatus for generating reduced video data operated by a method for generating reduced video data, a video stream compressed according to rules of a MPEG is divided into a motion vector, a discrete cosine transform (DCT) DC coefficient, a DCT AC coefficient, and reduced video data, which are appropriate for use in the video MP3 system, are generated by using the motion vector, the discrete cosine transform (DCT) DC coefficient, and the DCT AC coefficient. In the apparatus for restoring reduced video data operated by a method for restoring reduced video data, an intra-frame is over-sampled by using a discrete cosine transform (DCT) DC coefficient and a DCT AC coefficient, and restored to a picture signal, and an inter-frame is motion compensated by using the motion vector and restored to a picture signal.

16 Claims, 6 Drawing Sheets

VIDEO MP3 SYSTEM WITH APPARATUS AND METHOD FOR GENERATING AND RESTORING REDUCED VIDEO DATA

BACKGROUND OF THE INVENTION

1. Field of the Invention

The present invention relates to moving picture experts group (MPEG) video, and more particularly, to a video MP3 system.

2. Description of the Related Art

MP3 is a moving picture experts group (MPEG) layer three and is one portion of MPEG audio techniques. The MPEG is a study group organized for standardizing the compression and multiplexing of moving pictures and sound by an international organization for standardization (ISO) and an international electrotechnical commission (IEC). An MP3 player stores an audio signal, which is reduced according to rules stipulated in MPEG layer 3, and reproduces the reduced audio signal as a real audio signal.

FIG. 1 is a block diagram of a conventional audio MP3 player. Referring to FIG. 1, the conventional MP3 player includes a data interfacing unit 10, a micro-computer 11, a key inputting unit 12, a memory device 13, a display 14, an audio decoder 15, an audio reproducer 16, and a speaker 17.

The data interfacing unit 10 receives compressed data DATA of an audio signal from an MP3 encoder (not shown). The micro-computer 11 controls the data interfacing unit 10, receives the compressed data DATA from the data interfacing unit 10, stores the compressed data DATA in the memory device 13, transmits the compressed data DATA stored in the memory device 13 to the audio decoder 15, and operates the display 14 according to signals received from the key inputting unit 12.

The key inputting unit 12 sends a command requested by a user to the micro-computer 11. The compressed data DATA is stored in the memory device 13 under the control of the micro-computer 11, and the display 14 performs a display command of the micro-computer 11. The audio decoder 15 receives the compressed data DATA and a command from the micro-computer 11 and decodes the compressed data DATA in response to the command of the micro-computer 11, the audio reproducer 16 receives a decoded signal from the audio decoder 15 to reproduce the decoded signal as an audio signal, and the reproduced signal is output through the speaker 17.

In the conventional audio MP3 player of FIG. 1, an audio signal compressed according to the rules of MP3 can be processed, but a video signal cannot be processed. This is the reason a video file must be compressed in accordance with an international standard such as MPEG video compression, and a moving picture can be reproduced only if the compressed data are decoded by using an exclusive decoder such as an MPEG video decoder.

Thus, in order to process the video signal, an exclusive video decoder and a medium for storing a video signal which is bigger than the audio signal are required. In the conventional portable audio MP3 player, the capacity of usable power supply is restrictive. Thus, in order to process the video signal, considerable modification of the conventional portable audio MP3 player is required.

SUMMARY OF THE INVENTION

To solve the above problem, it is a first object of the present invention to provide a video MP3 system including an audio/video (AV) decoder which comprises a video decoder capable of implementing a moving picture.

It is a second object of the present invention to provide an apparatus for generating reduced video data which are appropriate for use in the video MP3 system.

It is a third object of the present invention to provide an apparatus for restoring reduced video data.

It is a fourth object of the present invention to provide a method for generating reduced video data which is appropriate for use in the video MP3 system.

It is a fifth object of the present invention to provide a method for restoring reduced video data.

According to a first aspect of the present invention, there is provided a video MP3 system. The video MP3 system includes a data interfacing unit, a memory device, a micro-computer, an audio/video (AV) decoder, an audio reproducer, and a video reproducer. The data interfacing unit receives compressed data of an audio signal and reduced data of a video signal. The memory device inputs and outputs the compressed data of an audio signal and the reduced data of a video signal. The audio/video (AV) decoder receives the compressed data of the audio signal and the reduced data of the video signal from the micro-computer, decodes the received compressed data of the audio signal to output restored audio data, and decodes the received reduced data of the video signal to output restored video data. The micro-computer receives the compressed data of the audio signal and the reduced data of the video signal from the data interfacing unit, stores the compressed data and the reduced data in the memory device and outputs the compressed data and/or the reduced data stored in the memory device. The audio reproducer receives the restored audio data to reproduce the restored audio data as an audio signal. The video reproducer receives the restored video data to reproduce the restored video data as a video signal.

In one embodiment, the audio/video decoder includes an audio decoder for decoding the compressed data of the audio signal to output the restored audio data and a video decoder for decoding the reduced data of the video signal to output the restored video data.

The video decoder can include a de-multiplexer for receiving the reduced data of the video signal. An over-sampler receives a discrete cosine transform (DCT) DC coefficient and a DCT AC coefficient from the de-multiplexer to over-sample an intra-frame. A motion compensator receives fed back restored video data and a motion vector of the reduced data of the video signal from the de-multiplexer, motion compensates an inter-frame using the motion vector and outputs the motion compensated inter-frame. An adder logically adds an output signal of the over-sampler and an output signal of the motion compensator to output the restored video data.

In accordance with another aspect of the invention, there is provided an apparatus for generating reduced video data. The apparatus includes a variable length code decoder (VLD), an inverse quantizer (IQ), and a multiplexer. The VLD receives a moving picture experts group (MPEG) video stream and decodes motion displacements and discrete cosine transform (DCT) data of the received MPEG video stream to output a motion vector, a quantization scale, and a quantization coefficient. The IQ receives the quantization scale and the quantization coefficient and performs inverse quantization of the received quantization scale and quantization coefficient to output a DCT DC coefficient and a DCT AC coefficient. The multiplexer multiplexes the motion vector, the DCT DC coefficient, and the DCT AC coefficient to generate reduced video data.

In accordance with another aspect of the invention, there is provided an apparatus for restoring reduced video data. The apparatus includes a de-multiplexer, an over-sampler, a motion compensator, and an adder. The de-multiplexer receives reduced video data. The over-sampler receives a discrete cosine transform (DCT) DC coefficient and a DCT AC coefficient of the reduced video data from the de-multiplexer to over-sample an intra-frame. The motion compensator receives predetermined, fed back restored video data and a motion vector of the reduced video data from the de-multiplexer, motion compensates an inter-frame using the motion vector and outputs the motion compensated inter-frame. The adder logically adds an output signal of the over-sampler and an output signal of the motion compensator to output the restored video data.

In accordance with another aspect of the invention, there is provided a method for generating reduced video data. According to the method, an MPEG video stream is received, and motion displacements and discrete cosine transform (DCT) data of the received MPEG video stream are decoded to generate a motion vector, a quantization scale, and a quantization coefficient. The quantization scale and the quantization coefficient are received, and inverse quantization of the received quantization scale and quantization coefficient are performed, to generate a DCT DC coefficient and a DCT AC coefficient. The motion vector, the DCT DC coefficient, and the DCT AC coefficient are multiplexed to generate reduced video data.

In accordance with another aspect of the invention, there is provided a method for restoring reduced video data. In accordance with the method, reduced video data is received, and the received reduced video data is divided into a motion vector, a discrete cosine transform (DCT) DC coefficient, and a DCT AC coefficient. An intra-frame is over-sampled using the DCT DC coefficient and the DCT AC coefficient. An inter-frame is motion compensated using predetermined, fed back restored video data and the motion vector. An OR operation is performed on data having undergone the steps of over-sampling and motion compensation to generate the restored video data.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
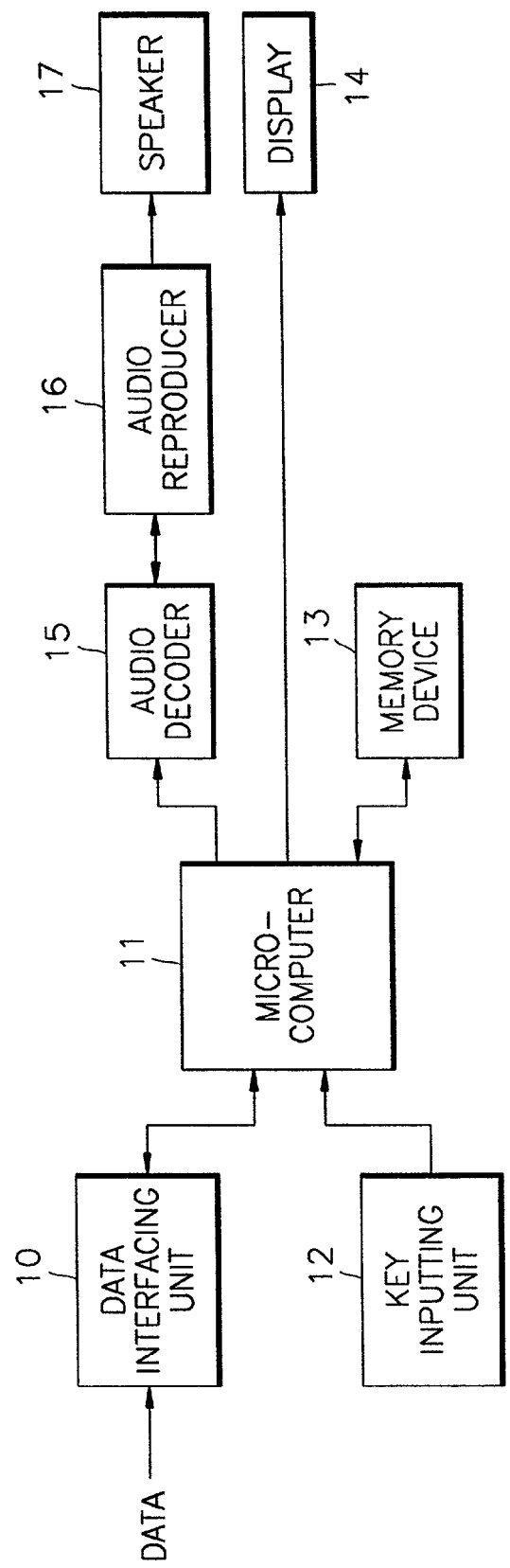
FIG. 1 is a block diagram illustrating an example of a conventional audio MP3 player.
Figure 2:
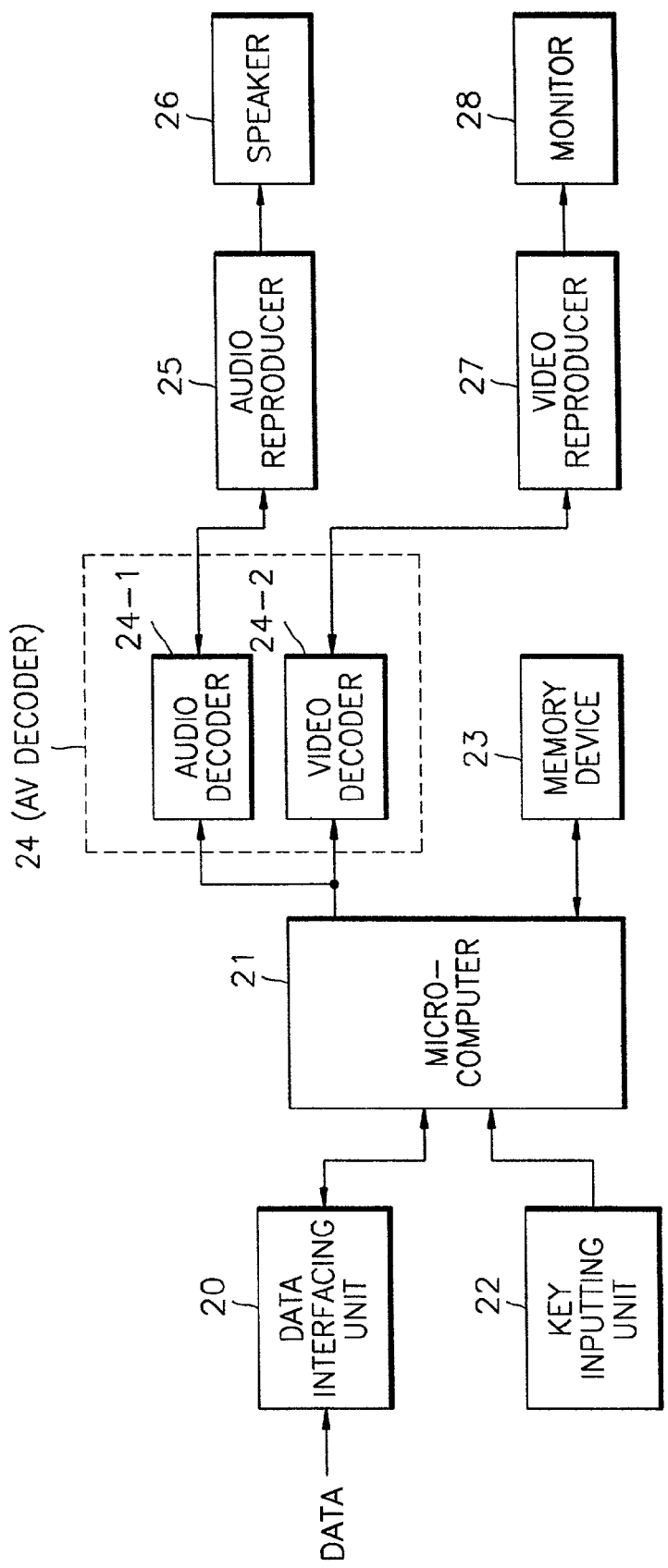
FIG. 2 is a block diagram illustrating an embodiment of a video MP3 system according to the present invention.

FIG. 2 is a block diagram illustrating an embodiment of a video MP3 system according to the present invention. Referring to FIG. 2, the video MP3 system includes a data interfacing unit 20, a micro-computer 21, a key inputting unit 22, an audio/video (AV) decoder 24, an audio reproducer 25, a speaker 26, a video reproducer 27, and a monitor 28.

The data interfacing unit 20 receives compressed data of an audio signal or reduced data of a video signal in response to a command of the micro-computer 21. The micro-computer 21 adjusts the data interfacing unit 20, receives data from the data interfacing unit 20 and stores the data in the memory device 23. The micro-computer 21 operates the monitor 28 in response to the signal of the key inputting unit 22, and transmits the compressed data stored in the memory device 23 to the AV decoder 24.

The key inputting unit 22 allows the micro-computer 21 to input a command so that a user can perform a desired function, and the memory device 23 inputs/outputs the data through the micro-computer 21. The AV decoder 24 includes an audio decoder 24-1 and a video decoder 24-2. The AV decoder 24 decodes the compressed data of the audio signal in response to the command of the micro-computer 21 in the audio decoder 24-1, transmits the compressed data to the audio reproducer 25, decodes the reduced data of the video signal in the video decoder 24-2 and transmits the reduced data to the video reproducer 27.

The operation of the video MP3 system according to signal flow of the compressed data will be described with reference to FIG. 2. The compressed data of the audio signal or the reduced data of the video signal, which are applied to the data interfacing unit 20 of the video MP3 system, are stored in the memory device 23 in response to the command of the micro-computer 21 and transmitted to the AV decoder 24 in response to another command of the micro-computer 21. The compressed data of the audio signal are decoded in the audio decoder 24-1, reproduced to an audio signal in the audio reproducer 25, and output through the speaker 26. The reduced data of the video signal are decoded in the video decoder 24-2, reproduced to a video signal in the video reproducer 27, and output through the monitor 28.

As described above, in the video MP3 system according to the present invention, the compressed data of the audio signal can be reproduced by using the audio decoder, and the reduced data of the video signal can be reproduced by using the video decoder.

Moving picture data used for display on a conventional PC monitor must be reduced to moving picture data which are appropriate for the size of a liquid crystal display (LCD) panel of a mobile phone similar to the size of a portable MP3 system according to the present invention.

Figure 3:
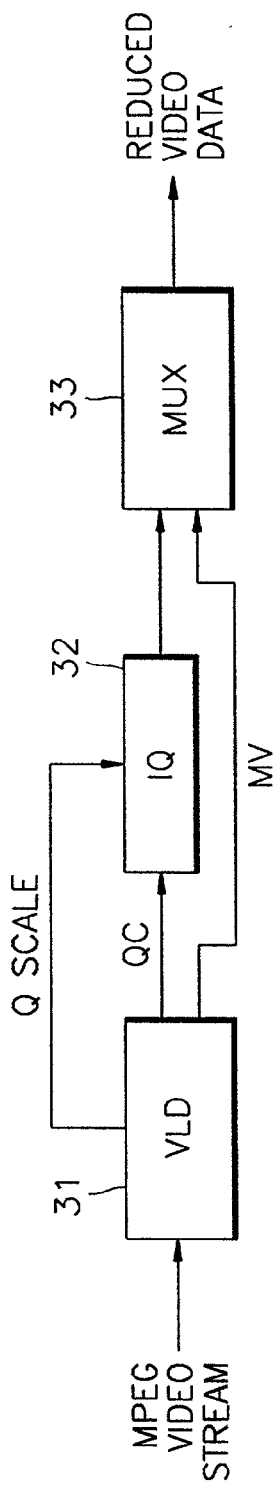
FIG. 3 is a block diagram of an apparatus for generating reduced video data according to the present invention.

FIG. 3 is a block diagram of an apparatus for generating reduced video data according to the present invention. Referring to FIG. 3, the apparatus for generating reduced video data includes a variable length decoder (VLD) 31, an inverse quantizer (IQ) 32, and a multiplexer 33.

The VLD 31 receives a moving picture experts group (MPEG) video stream and decodes motion displacements and discrete cosine transform (DCT) data. The IQ 32 receives a quantization scale (Q scale) and a quantization coefficient (QC) from the VLD 31, performs de-quantization, and outputs a DCT DC coefficient and a DCT AC coefficient. The multiplexer 33 receives a motion vector (MV) from the VLD 31 and the DCT DC coefficient and the DCT AC low frequency (LF) coefficient from the IQ 32, multiplexes the motion vector (MV), the DCT DC coefficient and the DCT AC low frequency (LF) coefficient, and outputs the reduced data (reduced video stream) of the video signal.

Referring back to FIG. 3, a method for generating reduced data of the video signal is to sort and multiplex the DCT low frequency coefficient and the motion vector of the MPEG video stream. In the MPEG for discrete-cosine-transforming one 8×8 (64)-pixel block and compressing data, the DCT DC coefficient denotes an average value for the 8×8 (64)-pixel block. In the case of using the DCT DC coefficient, one frame can be represented with 1/64 of the picture data to be indicated, thereby obtaining a down-sampling effect.

An over-sampling process must be performed to restore the size of a picture which is encoded to a MPEG. However, one or two low frequency (LF) coefficients (AC coefficients) among DCT coefficients is or are included in the reduced video picture. Also, in the MPEG, inter-frames are arranged between intra-frames which are references, thereby increasing compression efficiency using similarity between frames.

There are 15 frames in one group of pixels (GOP). Among them, a first frame is an intra-frame, and 14 inter-frames follow. In the case of the intra-frame, all the pixels included in the frame are decoded. However, in the case of the inter-frames, which are composed of a prediction (P) frame and a bi-direction (B) frame, only pixels which are varied with respect to similarity between intra-frame and the P frame and the B frame, are decoded.

One GOP I1 through B10 is as follows.

I1 B1 B2 P1 B3 B4 P2 B5 B6 P3 B7 B8 P4 B9 B10 I2

Here, the first frame I1 is an intra-frame, and 14 frames from B1 through B10 and P1 through P4 are inter-frames. The last frame I2 of the column is a starting point of a new GOP.

All pixels belonging to the intra-frame I1 are decoded. Among the inter-frames, pixels belonging to a fourth frame P1, a seventh frame P2, a tenth frame P3, and a thirteenth frame P4 are also decoded.

However, the second frame BI is decoded on the basis of picture variation between the intra-frame I1 and the fourth frame P1. The third frame B2 is decoded on the basis of picture variation between the second frame B1 and the fourth frame P1. Similarly, the fifth frame B3 is decoded on the basis of picture variation between the fourth frame P1 and the seventh frame P2. Hereinafter, the remaining inter-frames are decoded by the following method.

In the case of an inter-frame among the inter-frames B1 through B10, variation of the inter-frame is very small in comparison with that of the front and rear frames. If the small amount of variation is indicated by using a motion vector and a motion vector is used to indicate data of each frame, the amount of data to be indicated for each frame can be reduced. The motion vector denotes the degree of motion with respect to an arbitrary reference frame and by obtaining an average motion vector for each block.

Thus, in order to generate the reduced video data which are appropriate for use in the video decoder according to the present invention, first, the intra-frame is composed of DC coefficients of a reference frame. Next, a DC value of the inter-frame is obtained by using the motion vector.

Figure 4:
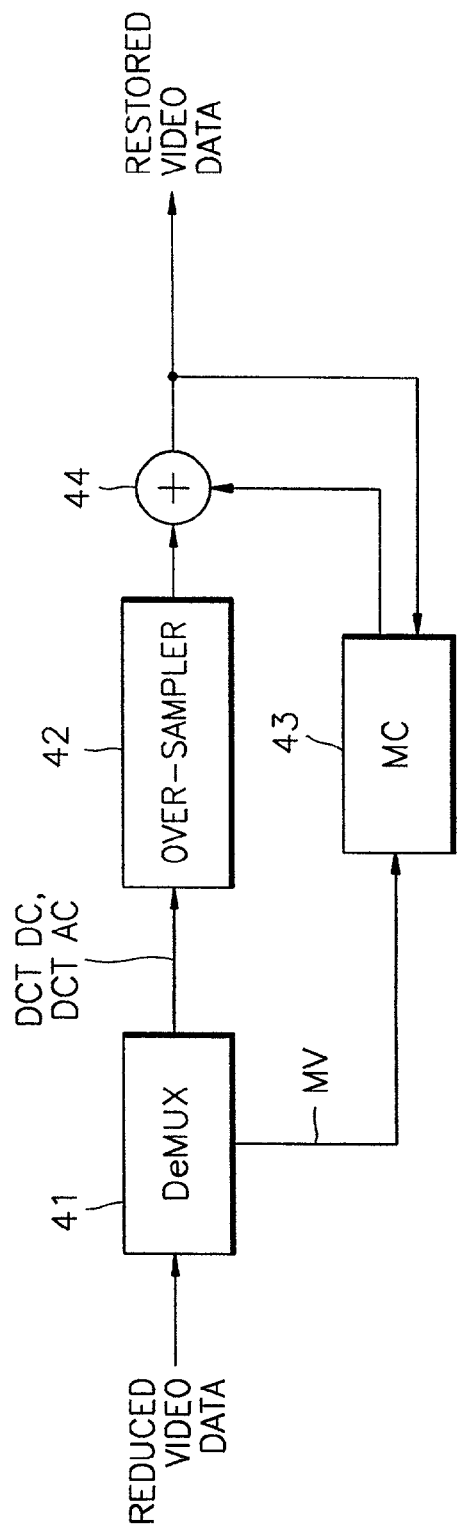
FIG. 4 is a circuit diagram of an apparatus for restoring reduced video data according to the present invention.

FIG. 4 is a circuit diagram of an apparatus for restoring reduced video data according to the present invention. Referring to FIG. 4, the apparatus for restoring reduced video data includes a de-multiplexer (DeMUX) 41, an over-sampler 42, a motion compensator (MC) 43, and an adder 44.

The DeMUX 41 receives a reduced video data and transmits a motion vector (MV) to the MC 43 and a DCT DC coefficient and a low frequency (LF) DCT AC coefficient to the over-sampler 42. The over-sampler 42 over-samples the DCT DC coefficient and AC coefficient, which are received from the de-multiplexer 41. The MC 43 receives the motion vector (MV), which is received from the DeMUX 41, and an output signal of the adder 44, and outputs a motion compensation signal to the adder 44. The adder 44 performs an AND operation of an output signal of the over-sampler 42 and the motion compensation signal output from MC 43.

The video data, which are reduced to an appropriate size by using the same method as that of FIG. 3, are input to the apparatus for restoring reduced video data of FIG. 4 and output as restored video data.

The apparatus for restoring reduced video data divides the received reduced video data into the motion vector (MV), the DCT DC coefficient, and the AC coefficient for each frame. That is, the intra-frame I1 is over-sampled by using the DCT DC coefficient and the AC coefficient and is restored to a video picture, and the inter-frames P1 through P4 and B1 through B10 pass through with a motion compensation process by using the motion vector (MV) and are restored to a video picture.

Figure 5:
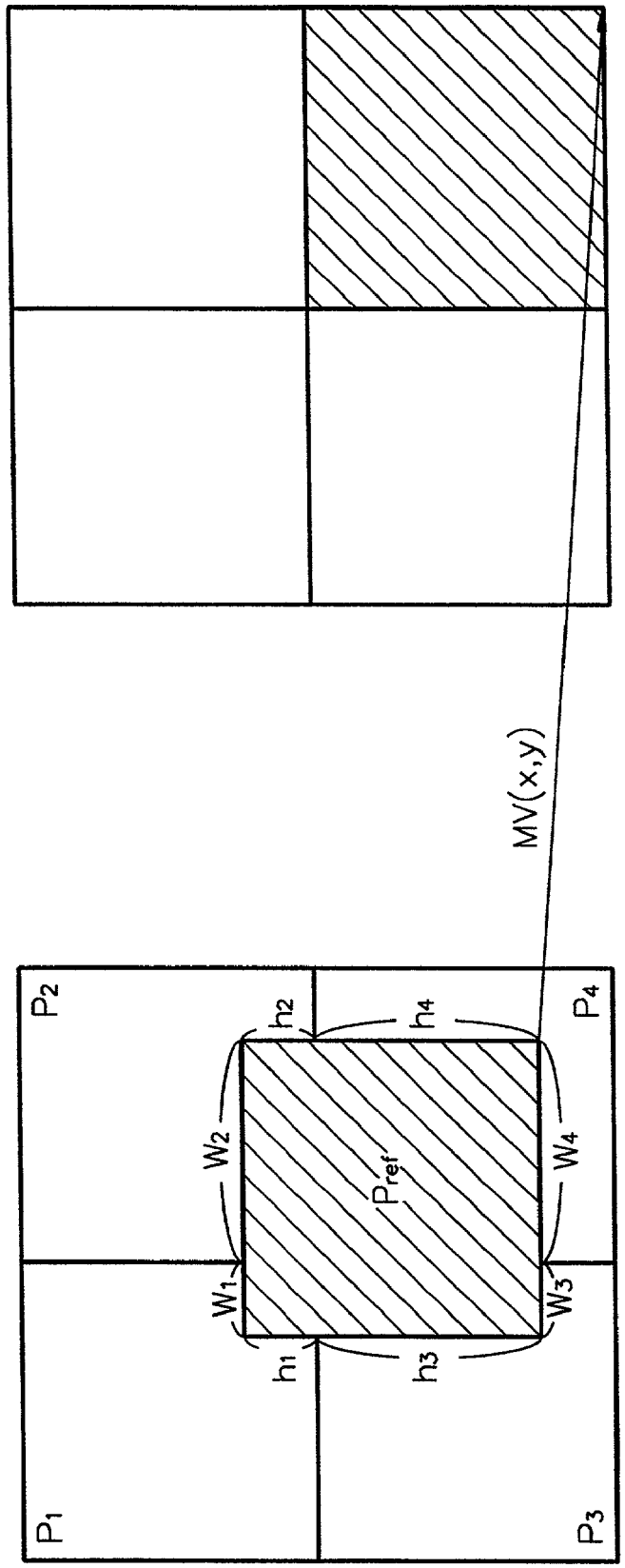
FIG. 5 illustrates a method for counting a DC value of an inter-frame using a DC value and a motion vector (MV) of a reference frame.

FIG. 5 illustrates a method for counting a DC value of an inter-frame using a DC value and a motion vector (MV) of a reference frame. Referring to FIG. 5, a DC value ($DC(P_{ref})$) for the present frame is obtained by Equation 1 based on the motion vector for a DC value of a reference frame ($P_{ref}$).

$$DC(P_{ref}) = [(P_1 \times w_1 \times h_1) + (P_2 \times w_2 \times h_2) + (P_3 \times w_3 \times h_3) + (P_4 \times w_4 \times h_4)] w_1 = w_3 = (8-x), h_1 = h_2 = (8-y),$$
$$w_2 = w_4 = x, h_3 = h_4 = y$$ [Equation 1]

Here, x and y denote motion vectors for the present frame, and $P_1$ through $P_4$ denote DC values of the reference frame indicated by the motion vectors.

If the reduced data are generated by using the DC value of the intra-frame and the motion vector of the inter-frame by the above method, the reduced data which is smaller than a data stream compressed according to the conventional MPEG can be generated so that it is considerably more advantageous to use the reduced data in a mobile phone using a small capacity memory.

Figure 6:
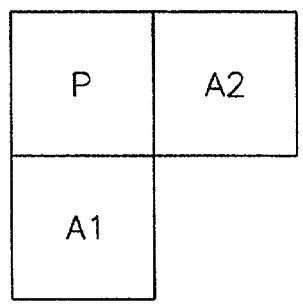
FIG. 6 illustrates a DC coefficient and two AC coefficients among discrete cosine transform (DCT) coefficients.

FIG. 6 illustrates a DC coefficient and two AC coefficients among discrete cosine transform (DCT) coefficients. Referring to FIG. 6, the DCT DC coefficient is P, and the two AC coefficients are A1 and A2.

Figure 7:
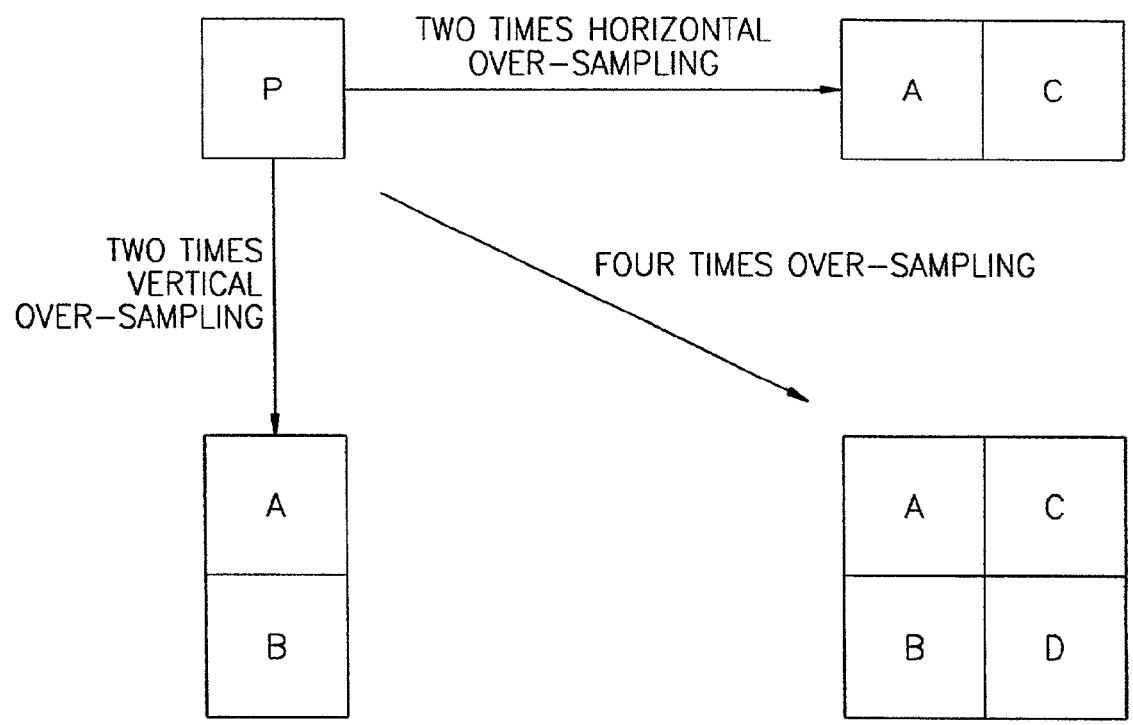
FIG. 7 illustrates an over-sampling method using the DCT DC coefficient and the two AC coefficients of FIG. 6.

FIG. 7 illustrates an over-sampling method using the DCT DC coefficient and the two AC coefficients of FIG. 6. In FIGS. 7, A, B, C, and D can be indicated by Equation 2.

$$A = P$$

$$B = Pq \, Ps \, \alpha$$

$$C = Pq \, Ps \, \beta$$ [Equation 2]

$$D = \frac{(B+C)}{2} \text{ or } \frac{A+B+C}{3}$$

Referring to FIGS. 6 and 7, a picture is enlarged by two or four times by low frequency (LF) AC coefficients for over-sampling by adding or subtracting the AC coefficients for the DC coefficients to or from the DC coefficients according to directions.

For example, a vertical over-sampling value B is obtained by adding or subtracting a varied amount, that is, P×α (0≦α≦1), according to A1 of the DC value for the DC value P. Likewise, a horizontal over-sampling value C is obtained by adding or subtracting a varied amount, that is, P×β (0≧β≧1), according to A2 of the DC value for the DC value P. In order to over-sample by four times, the DC value has an average value between the vertical over-sampling value B and the horizontal over-sampling value C, or an average value of the vertical over-sampling value B, the horizontal over-sampling value C, and the DC value A.

Figure 8:
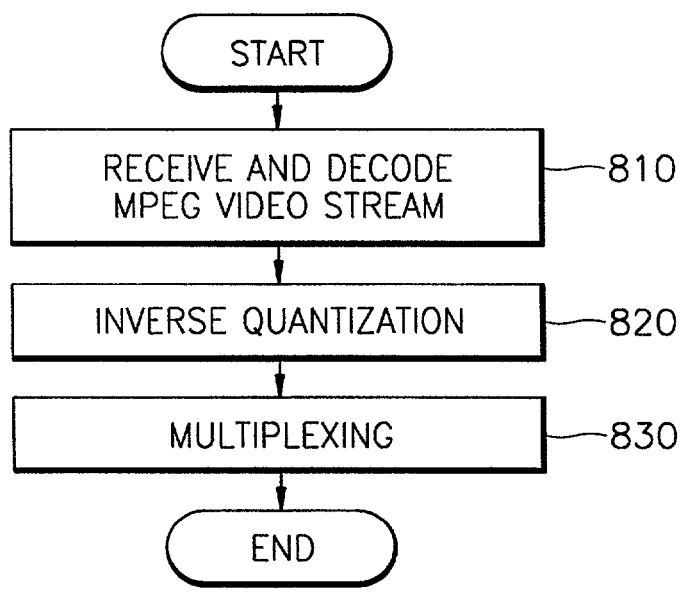
FIG. 8 is a flowchart illustrating the steps of generating reduced video data in the apparatus for generating reduced video data according to the present invention.

FIG. 8 is a flowchart illustrating the steps of generating reduced video data in the apparatus for generating reduced video data according to the present invention. Referring to FIG. 8, an MPEG video stream is received and motion displacements and DCT data are decoded, thereby generating a quantization scale and a quantization coefficient (step 810). The quantization scale and the quantization coefficient, which are generated in step 810, are received, thereby performing inverse quantization and generating the DCT DC coefficient and the DCT AC coefficient (step 820). The motion vector in step 810 and the DCT DC coefficient and the DCT AC coefficient in step 820 are multiplexed (step 830).

Figure 9:
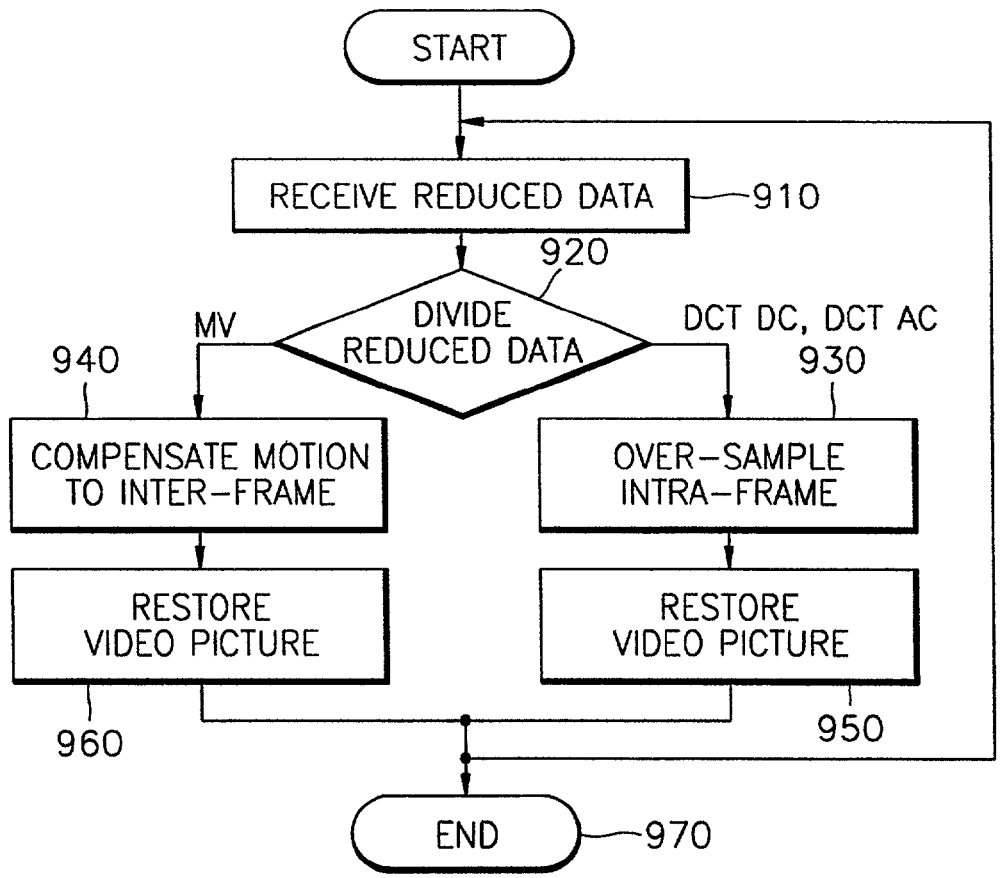
FIG. 9 is a flowchart illustrating the steps of restoring reduced video data in the apparatus for restoring reduced video data according to the present invention.

FIG. 9 is a flowchart illustrating the steps of restoring reduced video data in the apparatus for restoring reduced video data according to the present invention. Referring to FIG. 9, reduced data are received (step 910). The reduced data received in a first step (step 910) are divided into a motion vector (MV), a DCT DC coefficient, and a DCT AC coefficient (step 920). An intra-frame is over-sampled by using the DCT DC coefficient and the DCT AC coefficient divided in step 920 (step 930). The data over-sampled in step 930 are restored to a video picture, and returning to step 910, decoding is continuously performed (step 950). An inter-frame is motion compensated by using the motion vector (MV) divided in step 920 (step 940). The data compensated in step 940 are restored to the video picture, and returning to step 910, decoding is continuously performed (step 960). If the reduced data are no longer applied, the above operation is completed (step 970).

As described above, a video MP3 system, an apparatus and method for generating reduced video data which are appropriate for use in the video MP3 system, and an apparatus and method for restoring the reduced video data according to the present invention can use a moving picture simultaneously as well as an audio signal.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for generating display-compatible video data, the apparatus comprising:
    a variable length code decoder (VLD) for receiving a moving picture experts group (MPEG) video stream and decoding motion displacements and discrete cosine transform (DCT) data of the received MPEG video stream to output a motion vector, a quantization scale, and a quantization coefficient;
    an inverse quantizer (IQ) for receiving the quantization scale and the quantization coefficient and performing inverse quantization of the received quantization scale and quantization coefficient to output DCT coefficients; and
    a multiplexer for multiplexing the motion vector, and the DCT coefficients, to generate display-compatible video data.

2. A method for generating display-compatible video data, the method comprising:
    receiving an MPEG video stream, decoding motion displacements and discrete cosine transform (DCT) data of the received MPEG video stream to generate a motion vector, a quantization scale, and a quantization coefficient;
    receiving the quantization scale and the quantization coefficient and performing inverse quantization of the received quantization scale and quantization coefficient to generate DCT coefficients; and
    multiplexing the motion vector and the DCT coefficients to generate display-compatible video data.

3. A video MP3 system comprising: a portable enclosure, the contents of which comprise:
    a micro-computer capable of controlling data processing steps and other components;
    a memory device coupled to and controlled by the micro-computer, the memory device comprising stored compressed audio data and display-compatible video data;
    an audio/video (AV) decoder coupled to and controlled by the micro- computer;
    an audio reproducer coupled to the audio/video decoder; and
    a video reproducer coupled to the audio/video decoder,
    wherein the AV decoder divides the display-compatible video data into a motion vector, a discrete cosine transform (DCT) DC coefficient, and a DCT AC coefficient, and generates restored video data based on the motion vector the DCT DC coefficient and the DCT AC coefficient.

4. The system as claimed in claim 3, further comprising a data interfacing unit coupled to and controlled by the micro-computer, the data interfacing unit comprising a connector for communicating audio and video data to or from an external source.

5. The system as claimed in claim 3, further comprising a key inputting unit coupled to the micro-computer.

6. The system as claimed in claim 5, further comprising a display unit coupled to the video reproducer and the micro-computer.

7. The system as claimed in claim 6, wherein the micro-computer processes key inputting unit signals into corresponding control display unit signals and sends the control display unit signals to the display unit.

8. The system as claimed in claim 7, wherein the micro-computer also sends control signals to the audio/video (AV) decoder to process display-compatible video data.

9. The system as claimed in claim 7, wherein the display unit is sized for a mobile phone.

10. The system as claimed in claim 3, wherein the audio/video (AV) decoder comprises:
    an audio decoder; and
    a video decoder, the video decoder comprising a de-multiplexer, an over- sampler coupled to the de-multiplexer, a motion compensator coupled to the de- multiplexer, and an adder coupled to the over-sampler and the motion compensator.

11. A method for presenting audio and visual data in a portable device, the method comprising:
    storing compressed audio data and display-compatible video data in a memory device of the portable device;
    transmitting the stored audio data and video data to an audio/video decoder in the portable device;

decoding the audio data to an audio signal; and decoding the display-compatible video data to a video signal compatible with a display unit of the portable device, wherein decoding the display-compatible video data to a video signal comprises dividing the display-compatible video data into a motion vector, a discrete cosine transform (DCT) DC coefficient, and a DCT AC coefficient, and generating restored video data based on the motion vector, the DCT DC coefficient and the DCT AC coefficient.

12. The method as claimed in claim 11, wherein the step of decoding the video data comprises:

receiving the stored video data from the memory device;

dividing the video data into discrete cosine transform (DCT) coefficients and a motion vector;

over-sampling an intra-frame using the DCT coefficients to provide an over- sampled signal;

motion compensating an inter-frame using the motion vector and a feedback loop of a final video signal to provide a motion compensated signal; and adding the over-sampled signal and the motion compensated signal to generate the final video signal.

13. The apparatus as claimed in claim 1, wherein the display- compatible video data is compatible for display on a portable device.

14. The apparatus as claimed in claim 13 wherein the portable device is an MP3 device.

15. The method as claimed in claim 2, wherein the display-compatible video data is compatible for display on a portable device.

16. The method as claimed in claim 15, wherein the portable device is an MP3 device.

* * * * *

UNITED STATES PATENT AND TRADEMARK OFFICE
CERTIFICATE OF CORRECTION

PATENT NO. : 7,433,410 B2  
APPLICATION NO. : 09/971299  
DATED : October 7, 2008  
INVENTOR(S) : Seok-joong Yoon et al.

Page 1 of 1

It is certified that error appears in the above-identified patent and that said Letters Patent is hereby corrected as shown below:

Column 8, line 1 delete "," after "vector"

Column 8, line 2 delete "," after "coefficients"

Signed and Sealed this

Fifth Day of May, 2009

JOHN DOLL  
*Acting Director of the United States Patent and Trademark Office*